(12) United States Patent
Vaughan

(10) Patent No.: US 7,581,362 B2
(45) Date of Patent: Sep. 1, 2009

(54) CONDUIT WITH ADJUSTABLE LENGTH AND FIRE COLLAR

(75) Inventor: James A. Vaughan, Pahrump, NV (US)

(73) Assignee: METIS Holdings, Roseau (DM)

( * ) Notice: Subject to any disclaimer, the term of this patent is extended or adjusted under 35 U.S.C. 154(b) by 673 days.

(21) Appl. No.: 11/137,091

(22) Filed: May 24, 2005

(65) Prior Publication Data

US 2006/0265980 A1 Nov. 30, 2006

(51) Int. Cl.
*E04C 2/52* (2006.01)

(52) U.S. Cl. .................................... 52/220.1

(58) Field of Classification Search ............. 52/220.1, 52/220.5, 220.8, 219, 98, 99, 100, 232
See application file for complete search history.

(56) References Cited

U.S. PATENT DOCUMENTS

| | | | |
|---|---|---|---|
| 4,669,759 A | | 6/1987 | Harbeke |
| 4,901,488 A | * | 2/1990 | Murota et al. .................. 52/232 |
| 5,155,957 A | * | 10/1992 | Robertson et al. ............. 52/232 |
| 5,309,688 A | | 5/1994 | Robertson |
| 5,390,465 A | | 2/1995 | Rajecki |
| 5,456,050 A | * | 10/1995 | Ward ......................... 52/220.8 |
| 5,661,891 A | | 9/1997 | Miller et al. |
| 5,729,938 A | * | 3/1998 | Tobias ........................ 52/220.8 |
| 6,176,052 B1 | * | 1/2001 | Takahashi ..................... 52/232 |
| 6,405,502 B1 | | 6/2002 | Cornwall |
| 6,470,635 B2 | | 10/2002 | Cornwall |
| 6,643,985 B2 | | 11/2003 | Munzenberger |
| 6,694,684 B2 | | 2/2004 | Radke et al. |
| 6,732,481 B2 | | 5/2004 | Stahl, Sr. |
| 6,792,726 B1 | * | 9/2004 | Price ......................... 52/220.8 |
| 6,862,852 B1 | * | 3/2005 | Beele ......................... 52/220.8 |
| 6,969,799 B2 | * | 11/2005 | Snyder ....................... 174/483 |
| 7,010,889 B1 | * | 3/2006 | Renfro ........................ 52/219 |
| 2003/0009961 A1 | | 1/2003 | Radke et al. |
| 2004/0045233 A1 | | 3/2004 | Beele |
| 2004/0168398 A1 | * | 9/2004 | Sakno et al. ............... 52/741.4 |

* cited by examiner

*Primary Examiner*—Richard E. Chilcot, Jr.
*Assistant Examiner*—Jessica Laux
(74) *Attorney, Agent, or Firm*—Gene Scott; Patent Law & Venture Group

(57) ABSTRACT

A cylindrical tube of extendable length, the tube having open ends. A first, second and third transverse flanges fastened at one or both of the opposing ends of the tube. The first flange is integral with the tube and sandwiched between the second and the third flanges. A ring is coextensive with the first flange and covers part of the open end of the tube. A heat expansive material is placed within the tube for expansion during fire to cover spaces between utility conduits and the inside wall of the tube.

4 Claims, 4 Drawing Sheets

CONDUIT WITH ADJUSTABLE LENGTH AND FIRE COLLAR

BACKGROUND

1. Related Applications
none
2. Field of the Present Disclosure
This disclosure relates to the field of fire safety apparatus and more particularly to apparatus for preventing flames and smoke from penetrating a wall through a hole formed to pass pipes, cables or the like.
3. Description of Related Art
The following art defines the present state of this field and each US disclosure is hereby incorporated herein by reference:

Radke et al., U.S. 2003/0009961, discloses a cast-in-place pass through firestop device for providing a passage in a partition in a structure through which wires, cables, pipes, and the like are run that includes a housing having a riser portion with frangible connections that define removable bands that can be readily removed by a user to adjust the height of the device in accordance with the thickness of the partition into which the device is installed. The removable bands include pull tabs that provide grasping means to facilitate removal of the bands by a user along a frangible connection. The housing also includes a base portion including a recess with ribs for maintaining the firestop material in spaced relation from the base portion sidewall.

Beele, U.S. 2004/0045233, discloses a sealing system comprising an at least substantially cylindrical tube and at least two sealing collars at least partially made of an elastic material, which are arranged round the tube in spaced-apart relationship for sealing confinement by collaring of the tube in a bushing which is co-axial with the tube, a special feature being the fact that the spacing between the sealing collars is less than 25 mm, the sealing collars comprising an expandable material, in such an amount and of such a composition that the sealing collars will expand in the case of a fire, in such a manner that they will become wedged in the bushing.

Harbeke, U.S. Pat. No. 4,669,759, discloses a fire-stop stack fitting that includes a cylindrically-shaped coupling wall having a stop therein for receiving pipes to be coupled from first and second ends. The first end of the cylindrically-shaped coupling wall is affixed to a cavity forming wall defining a cavity which is open in an inwardly radial direction and in a first-end axial direction but which is closed in an outwardly radial direction and in a second-end axial direction. An attachment flange is affixed to the first end of the cavity-forming wall for attaching the fire-stop stack fitting to a concrete form. An intumescent material is placed in an intumescent-material cavity and the flange of the fire-stop stack fitting is fastened to a concrete form wall. After concrete has hardened and the form wall is removed, pipes are inserted in opposite ends of the cylindrically-shaped wall. The intumescent-material is quickly heated by fire on the first side of the wall since the intumescent-material cavity is open to that side and the intumescent material is free to expand radially into the pipe inserted into the first end of the fitting.

Robertson, U.S. Pat. No. 5,309,688, discloses a penetration unit for a concrete slab including a hollow housing open at one end for receiving a service line or pipe, and provided at its other end with an enlarged opening surrounded by an annular flange which enables connection of the housing to formwork defining the boundary of the concrete slab. The housing defines a hollow space in which the service line or pipe terminates and may be connected to a further line or pipe such as an elbow. A puddle flange may be located about the service line or pipe and engage the housing. Intumescent material may be located in the hollow space surrounding the pipe or line.

Rajecki, U.S. Pat. No. 5,390,465, discloses a device for installation in a building wall or floor to provide a passthrough opening for pipes, tubing, and the like that includes an axially open first end and a second end closed by a transverse wall. A ring of intumescent material fills the axially open first end of the housing, and in one embodiment, a foam plastic filler material substantially fills the housing between the intumescent ring and the transverse wall. The intumescent ring can be provided with a central opening sized to engage with an interference fit a tube or pipe passing through the device. Alternatively, the ring can support a tube coupling for providing a tubular connection within the device to receive and couple pipes on opposite sides of the building wall or floor in which the device is installed.

Ward, U.S. Pat. No. 5,456,050, discloses a sleeve configured to be assembled through a wall-breaching hole so as to prevent the passage of flame and smoke therethrough. The sleeve has a barrel with a fixedly secured flange on one end thereof. An intumescent sheet material is adhered to the inner and the outer surface of the barrel. After passing the barrel through the hole in the wall, a second flange is mounted on the second end of the barrel. Each flange is fastened to a respective side of the wall through a series of holes in the flanges. Each flange has a series of circumferential tabs adapted to being bent inwardly and has a ring of intumescent putty within the tabs and a second ring of intumescent putty on its wall-facing surface. When the sleeve is installed and secured to the wall, a utility-carrying conduit is passed through the barrel and the tabs are bent inward to support and closely surround the conduit. In the presence of heat the intumescent material expands to fill any gaps between the sleeve and the conduit and between the sleeve and the wall so as to prevent the passage of smoke or flame.

Cornwall, U.S. Pat. No. 6,405,502, discloses a firestop coupling assembly for allowing the passage of utility members through a hole in a partition while preventing the transmission of fire and smoke through the hole. The coupling assembly includes a coupling and a firestop extension. The firestop extension has a housing with an inner passageway. Intumescent material is mounted in the inner passageway of the housing. The firestop extension is mounted on the coupling such that the intumescent material extends downward beyond a second end of the coupling. When the coupling assembly is exposed to heat, the intumescent material expands into the inner passageway of the housing of the firestop extension and blocks the second end of the housing of the coupling which prevents the transmission of smoke and fire through the coupling assembly.

Miller et al., U.S. Pat. No. 5,661,891, discloses a conduit assembly which has an inner sleeve and outer sleeve which are proportioned to be concentrically mounted, each of which has a longitudinal slot of approximately the same width. The conduits are circular, and a detent is provided on the larger of the conduits to accept and nestingly receive the slot of the smaller conduit when the same is rotated to form a complete circular encasement of the wires or cables which are passed through the conduits. The method of the invention contemplates the steps of forming a hole through a wall, such as a firewall, thereafter, optionally, passing the wires through, or passing the inner and outer sleeve through, and then once the wires are in place, or in anticipation of the wires being inserted, rotating the inner sleeve within the outer sleeve until the sleeve slots are approximately diametrically opposed and the central sleeve slot is secured in the detent. After the wires are in place interiorly of the conduit, a packing is inserted through the conduit assembly. Thereafter a blow out patch is secured to the exterior portion of the firewall on both side, and receives the end of the conduit assembly. The blow out patch, in turn, is secured to the firewall making a complete installation in which there are voids are minimized, which voids could pass smoke, fire, fumes, or other undesirables.

Cornwall, U.S. Pat. No. 6,470,635, discloses a firestop coupling assembly to allow the passage of utility members through a hole in a partition while preventing the transmission of fire and smoke through the hole. The coupling assembly including a coupling and a firestop extension. The firestop extension has a housing with an inner passageway. Intumescent material is mounted in the inner passageway of the housing. The firestop extension is mounted on the coupling such that the intumescent material extends downward beyond a second end of the coupling. When the coupling assembly is exposed to heat, the intumescent material expands into the inner passageway of the housing of the firestop extension and blocks the second end of the coupling which prevents the transmission of smoke and fire through the coupling assembly.

Munzenberger, U.S. Pat. No. 6,643,985, discloses a tubular lead-in fixture including an attachment element for a temporary attachment of the lead-in fixture, and an axially extending, radially widening region provided within an embeddable length of the lead-in fixture and limited by spaced from each other, radial shoulders, and in which an intumescent mass is received.

Radke et al., U.S. Pat. No. 6,694,684, discloses a cast-in-place pass through firestop device for providing a passage in a partition through which wires, cables, pipes, and the like are run that includes a housing having a riser portion with frangible connections that define removable bands that can be readily removed by a user to adjust the height of the device in accordance with the thickness of the partition into which the device is installed. The removable bands include pull tabs that provide grasping means to facilitate removal of the bands by a user along a frangible connection. The housing also includes a base portion including a recess with ribs for maintaining firestop material in spaced relation from the base portion sidewall. A flame retardant char forming material, which works in combination with the firestop material to provide a fire, smoke, and water barrier, may also be provided adjacent the firestop material.

Stahl, Sr., U.S. Pat. No. 6,732,481, discloses an intumescent firestopping apparatus used in poke-through applications for selectively sealing an opening through a construction barrier such as a wall, floor or ceiling having cables or other penetrating members extending therethrough. The apparatus effectively seals this barrier responsive to a fire to prevent unwanted transmission of fire through conventional construction barrier areas. The apparatus includes a sleeve with two intumescent pads positioned therein. At least one of the pads has an arcuate curved central section to be biased against the other intumescent pad to define therebetween a confinement area for holding of cables centrally located therein in a dynamically adjustable sealing throat defined therebetween. These pads can be variously mounted with respect to the adjacent wall structures and one or both of the pads can be arched toward the other pad to facilitate defining of the dynamic throat for receiving cables extending therethrough.

Our prior art search with abstracts described above teaches the use of cylindrical hole liners with fire and smoke retarding components within walls for the prevention of fire and smoke movement between compartments. However, the prior art fails to teach the construction of an inexpensive conduit with substantial, structural end flanges, telescoping length adjustment and heat expansive collar with a ring for sizing the end of the tube for a particular conduit diameter. The present disclosure distinguishes over the prior art providing heretofore unknown advantages as described in the following summary.

SUMMARY

This disclosure teaches certain benefits in construction and use which give rise to the objectives described below.

Water, gas, electricity, steam and the like as well as associated pipes, conduits and cables when associated with a building are often referred to collectively as the "utilities". In the process of construction, it is standard for walls and floors of a building to be built and later penetrated for the utilities to be installed. This method of construction normally means that the walls will be breached with a series of holes that are somewhat larger than the utility conduit to be installed. This size discrepancy is both an expedient method, from the standpoint of labor utilization, and a necessary variance because the utility conduit may be of a different size from the available standard sizes of hole making apparatus. Once such a hole is made and a conduit or a number of conduits are passed through, the gap remaining around the conduit or conduits provides a passage through which, in the event of a building fire, flame and smoke may be transmitted from one room to another, increasing damage and injury.

When the walls are constructed of materials which are able to contain a fire for a period of time, such a wall-breaching hole will void the value of the wall's fire retardancy. Much effort has been expended toward eliminating these wall-breaching holes, and thus containing a fire to a single room in a building. Underwriters Laboratories, Inc. has developed a Fire Resistance Directory, a section of which is devoted to Through-Penetration Firestop Devices, beginning on page 1252. A number of known devices and methods are listed therein. Included in the standard materials known in the industry and identified in the Directory are thermo-expansive, or intumescent, materials. The intumescent material referred to in the Directory and as used herein is initially activated to expand when the material reaches a temperature of about 150.degree. C. (300.degree. F.), and it expands to between 5-15 times its original volume.

In addition to the Underwriters Laboratories, Inc. Directory, the Minnesota Mining and Manufacturing Company (3M) provides a catalog of fire prevention products. Included in the 3M product grouping are intumescent materials which are supplied in the form of caulking and flexible strips. 3M also advertises a collar, taught in U.S. Pat. No. 5,103,609 to Thoreson et al. as an Intumescent Fire Stop Device. The '609 patent discloses a collar adapted to be installed around a utility conduit at the point of wall-penetration and having an intumescent lining and heat conducting tabs. The collar also includes wall-attachment tabs.

A further United States patent directed to the field of the invention is U.S. Pat. No. 5,155,957 to Robertson et al. for a Fire Safety Device. The device of the '957 patent is adapted for closing through-holes in floors and walls and for stopping the potential spread of fire and smoke. The '957 device includes a section of conduit, a cup-shaped retainer and a quantity of intumescent material. As shown by the above prior art references, it is well known to use a tube within walls as a device for placing conduits between compartments. It is also known to use intumescent materials within such pipes to fill gaps between the conduits and the inside surfaces of the tube so that smoke and fire cannot move between compartments.

However, it is problematic as to how to place such tubes within walls, especially when the walls are of concrete or similar materials. One solution is to place the tube in the forms prior to pouring the concrete so that the tube becomes integral with the concrete wall. To accomplish this, it is necessary to provide an adequate flange on one or both ends of the tube, a flange that may be anchored to the concrete forms. However, such tubes with flanges must also meet the requirement of being low cost. The forming of a tube of sheet metal meets the low cost criteria as well as being of a material that is highly fire resistant, however, it is generally expensive to form such tubes with generous flanges. Furthermore, it is necessary to provide such tubes with the ability to adapt their length to the thickness of the wall into which they are to be placed.

The present apparatus provides a solution to these challenges in a manner that has not been found in the prior art.

A telescoping cylindrical tube is extensive so as to pass within a wall terminating with end flanges against the outside wall surfaces. When placed in forms prior to concrete pour, the tube flanges are fastened to the inside surface of the forms. At each end of the tube, the flanges are made up of a first, second and third transverse flanges. The first flange is integral with the tube, the second flange is positioned on the inside of the first flange for contact with one of the wall surfaces, and the third flange is positioned on the outside of the first flange. A flat ring is engaged continuous with the first flange and extends into the open end of the tube, joined by tack welding. One or more coils of intumescent material are placed within the tube adjacent to the ring. The result is that the tube is integral with the wall and receives utility pipes or conduits so that such conductors may be easily placed between compartments separated by the wall. In case of fire the intumescent material is able to prevent smoke and fire from spreading between compartments.

A primary objective inherent in the above described apparatus and method of use is to provide advantages not taught by the prior art.

Another objective is to provide a conduit for receiving utility conductors between compartments.

A further objective is to provide such a conduit that is able to be easily extended to the thickness of the wall into which it is placed.

A still further objective is to provide such a conduit that is able to stop the movement of smoke and fire through the conduit.

A yet further objective is to provide such a conduit that is economically fabricated.

Other features and advantages of the described apparatus and method of use will become apparent from the following more detailed description, taken in conjunction with the accompanying drawings, which illustrate, by way of example, the principles of the presently described apparatus and method of its use.

BRIEF DESCRIPTION OF THE DRAWINGS

The accompanying drawings illustrate at least one of the best mode embodiments of the present apparatus and method of it use. In such drawings.

DETAILED DESCRIPTION

The above described drawing figures illustrate the described apparatus and its method of use in at least one of its preferred, best mode embodiment, which is further defined in detail in the following description. Those having ordinary skill in the art may be able to make alterations and modifications what is described herein without departing from its spirit and scope. Therefore, it must be understood that what is illustrated is set forth only for the purposes of example and that it should not be taken as a limitation in the scope of the present apparatus and method of use.

Figure 1:
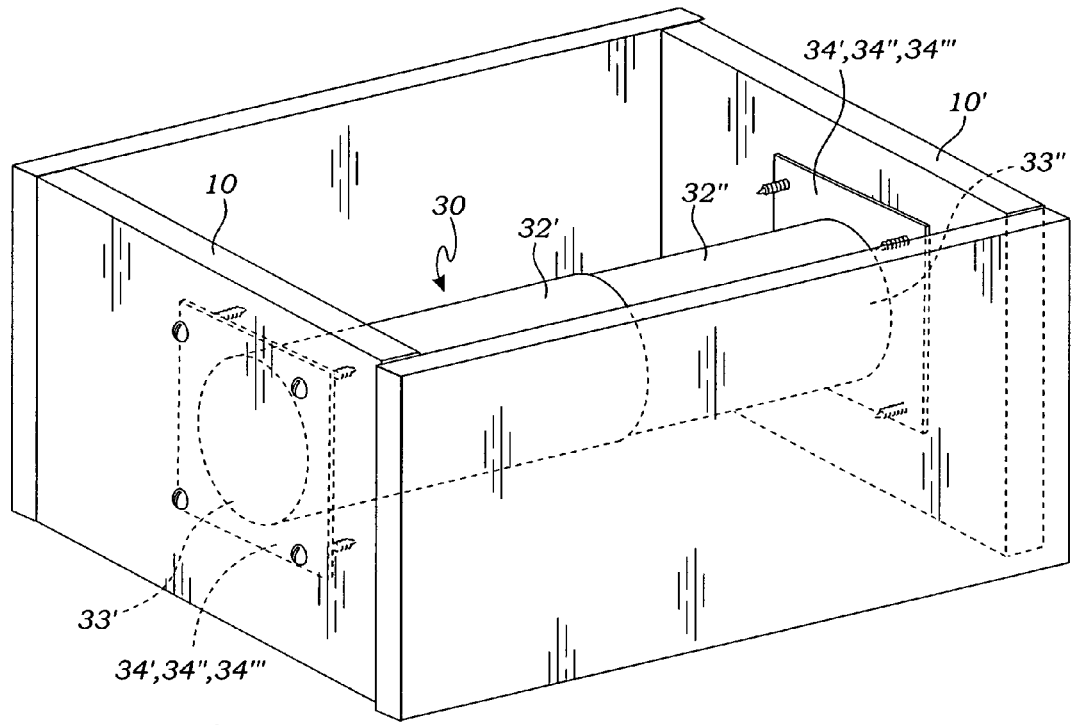
FIG. 1 is a perspective view of one embodiment of the apparatus, with a flange at each end, as mounted in a concrete form.
Figure 2:
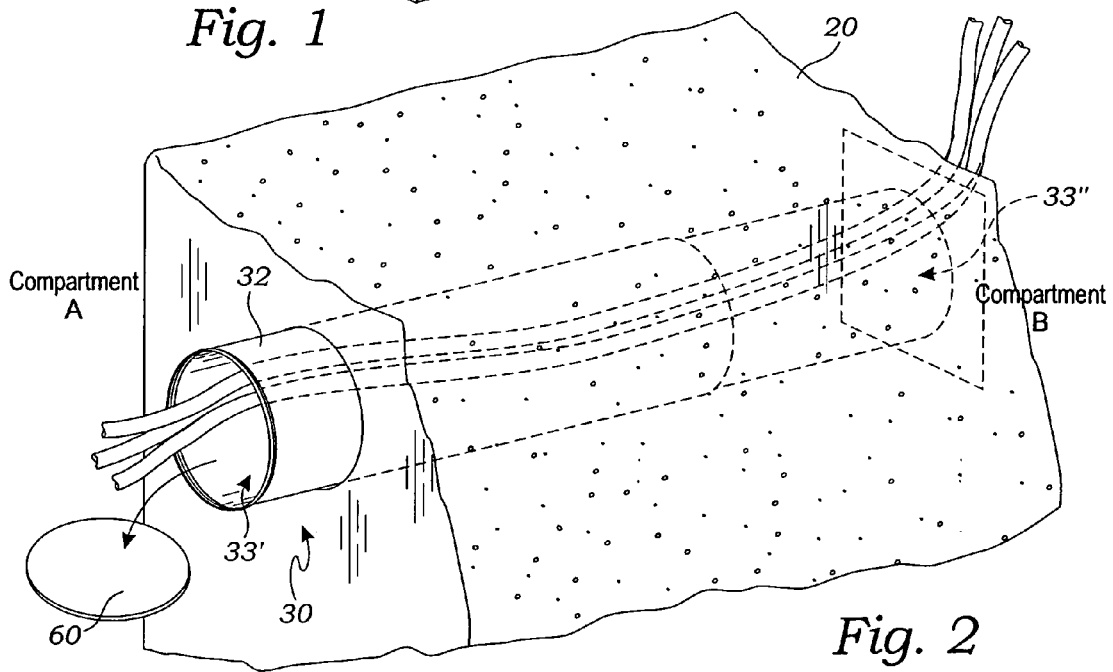
FIG. 2 is a perspective view of a further embodiment of the apparatus as formed within a concrete wall with one end providing a flange and an opposing end without a flange.
Figure 3:
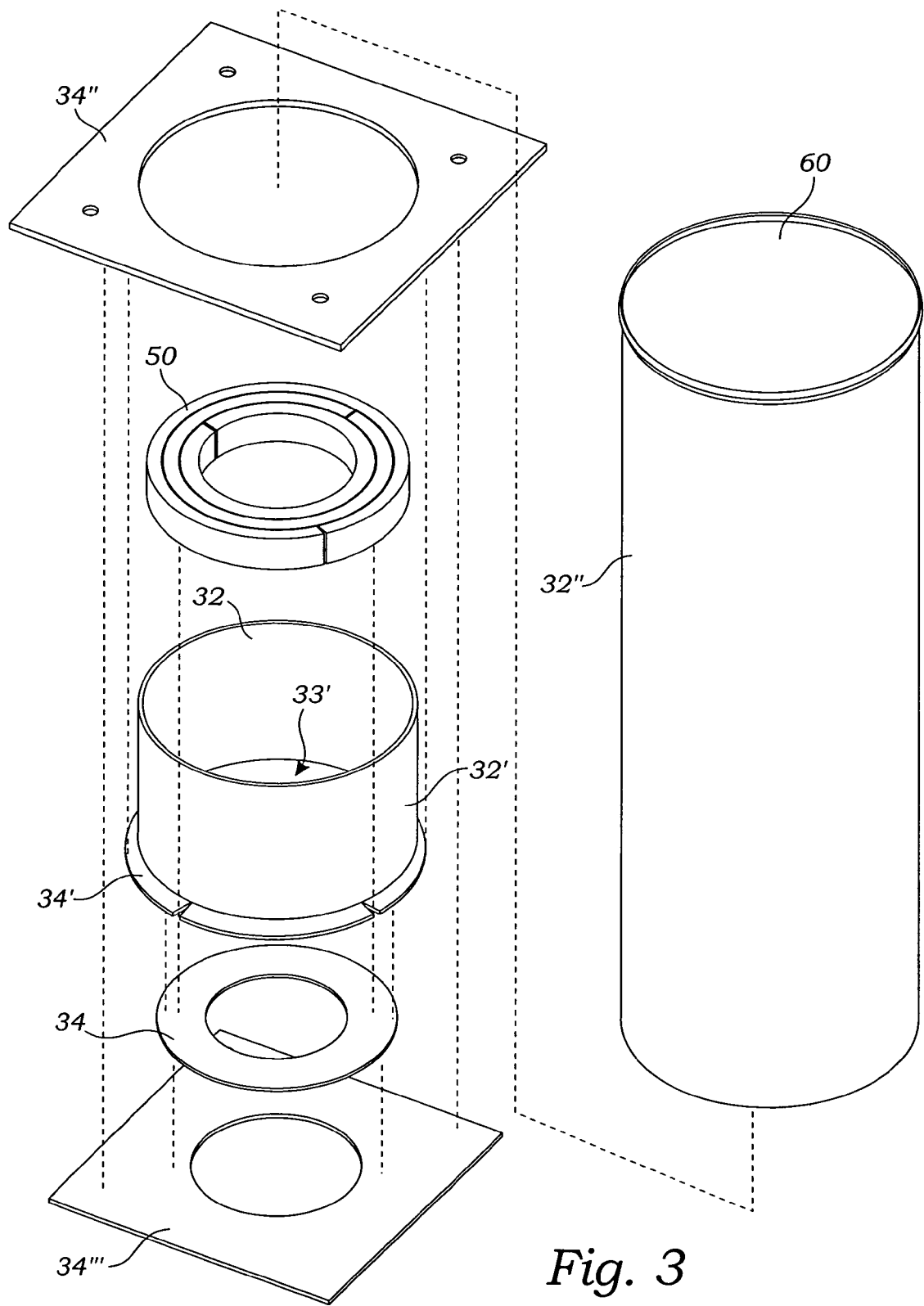
FIG. 3 is an exploded perspective view the of the embodiment of FIG. 2.

The presently described apparatus, in one embodiment, comprises a tubular element fastened between forms erected for pouring a concrete structure such as a wall, a floor or a ceiling and provides a passage for utility conductors such as pipes and conduits, as shown in FIG. 1. In a further embodiment, the tubular element is integral with a structural separator such as a wall, a partition, a floor or a ceiling, as best shown in FIG. 2. In a still further embodiment of the present apparatus, the tubular element is a stand-alone component that may be used as described or in alternative ways without limit as would be known by those of skill in the art. Thus, it should be realized by those of skill that the tubular element described herein may be used in a very wide range of applications where the tubular element is only one component of an apparatus that is necessary to an end objective.

Therefore, in the first embodiment described above, the apparatus comprises a pair of forms 10 and 10' set up for defining a poured concrete wall 20 for separating compartments or rooms or spaces, and this embodiment includes a tubular conduit 30 positioned for joining the compartments, as shown in FIG. 1. Such a wall 20 may be used for separating side-by-side adjacent compartments, or compartments arranged one above the other. In either case, the arrangement of components of the conduit 30, as described below, is identical. FIG. 2 shows a wall 20 that is used to separate side-by-side compartments "A" and "B."

The tubular element, conduit 30, comprises a cylindrical tube 32 that is formed integrally with the wall 20 when the wall 20 is poured and cured, as shown in FIG. 2. The tube 32 is extensive between the forms 10 and 10' and is preferably made of galvanized steel sheet metal stock, with open opposing ends 33' and 33". At one (FIG. 2) or both (FIG. 1) of the opposing ends 33', 33", a first 34' flange is formed as a transverse extension of tube 32 by bending, and a second 34" and third 34''' separate sheet metal plates form transverse flanges that are fastened about the tube 32. Additionally a sheet metal ring 34 is fastened to the first flange 34' and this ring 34 extends transversely to partially cover the open end 33' or 33" of the tube 32. The several parts are all made of sheet metal stock and are joined to each other by tack, or spot welding. In this arrangement, the first flange 34' is integral with the tube 32, i.e., it is formed by bending the thin sheet material of the tube 32 outwardly at one or both of its open ends 33', 33". The second flange 34" is positioned on one side (the inside) of the first flange 34' and therefore lies in contact with one of the wall surfaces of the wall 20. The third flange 33" is positioned on the other side (the outside) of the first flange 34'. Preferably, the flanges are spot welded together, or fastened in an equivalent manner so that they are permanently fastened about tube 32. The use of multiple plates to form a composite flange at one or both of the ends of tube 30 provides the advantage of great strength, as opposed to a single flange, and low cost as the parts are made of an inexpensive material and are cheaply fabricated by stamping, bending and welding operations which may be fully automated without great investment.

Figure 4:
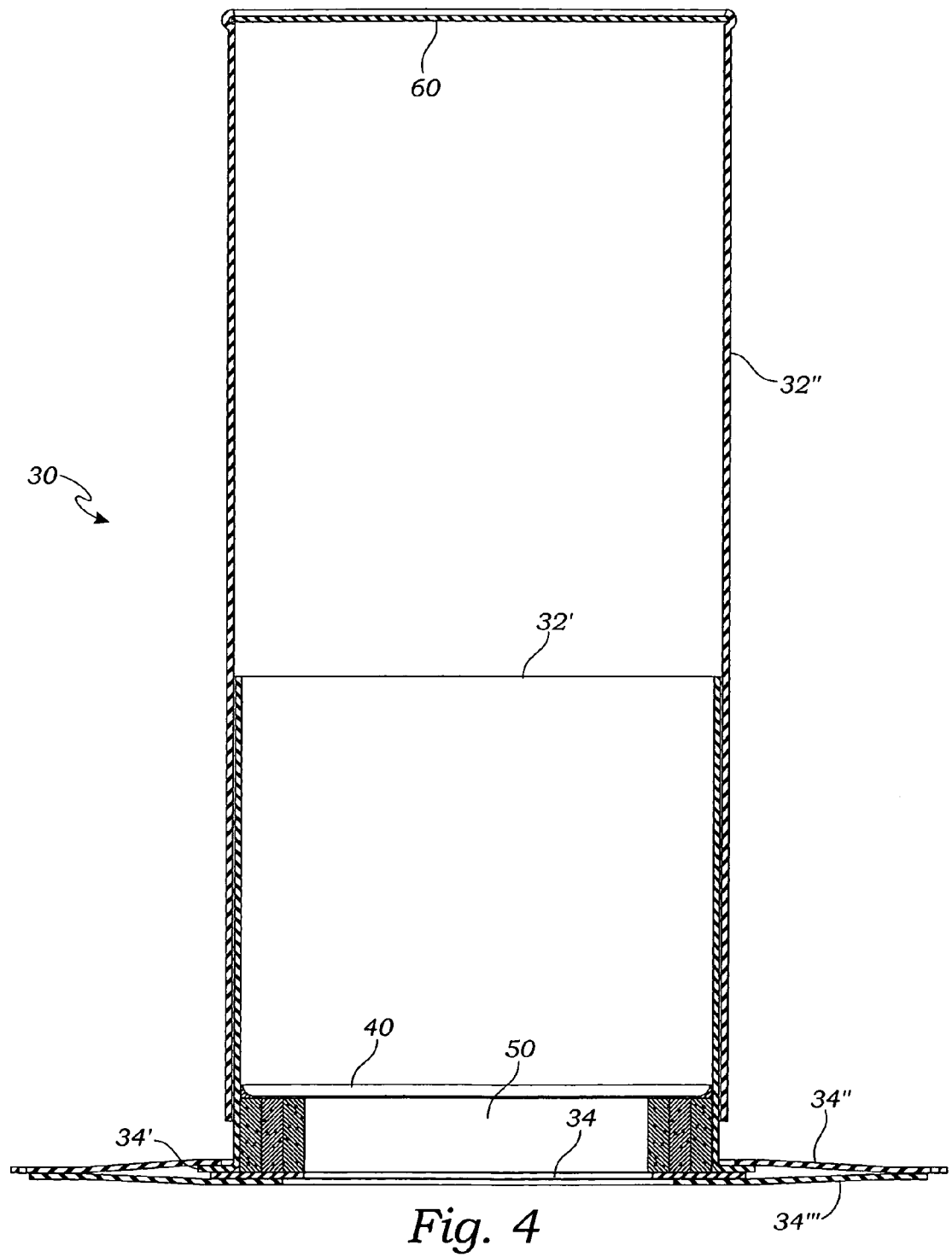
FIG. 4 is a vertical section view of the embodiment of FIG. 2 shown assembled.
Figure 5:
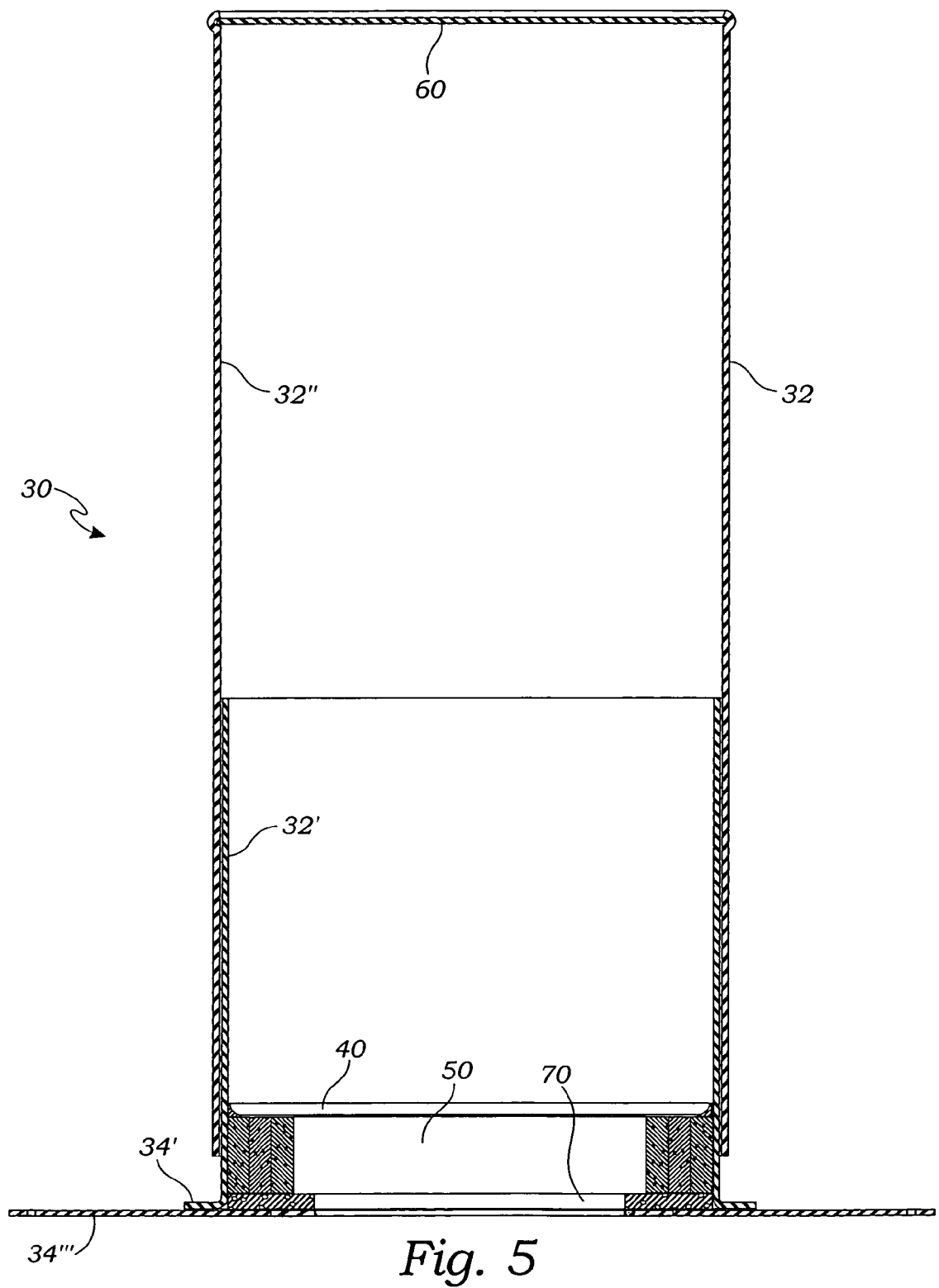
FIG. 5 is a vertical section view similar to that of FIG. 4, of a still further embodiment of the present apparatus.

One or more layers of intumescent material 50, i.e., a material that expands greatly upon exposure to heat and is well known in the art, is/are positioned within the tube 32, as best seen in FIGS. 4 and 5, adjacent to the ring 34, where the layer(s) of intumescent material 50 is/are held in place by a bonding agent 40 such as a mastic also well known in the art. An insulating material (not shown) may be placed within the tube 32 to provide a thermal barrier. Those of skill in the art will know to use such thermal barriers of specific types for particular applications.

When the flanges 33', 33", 33''' and ring 34 are applied to only one end of the tube 32, a cap 60 is fastened at the other of the opposing ends of the tube 32 so as to prevent cement or other materials from entering tube 32. This cap 60 is engaged with the tube 32 in such manner as to easily be removed when necessary, and one alternative manner of accomplishing this is shown in FIGS. 4 and 5.

Preferably, the tube 32 is made up of two collinear sections 32' and 32" joined, as shown in FIGS. 4 and 5 for tight engagement but enabled for sliding extension as shown so that the tube 32 is able to be adjusted in length to the desired size for walls of varying thickness.

In a further embodiment of the present apparatus, the conduit 30 is formed of the same material and in a similar manner to the embodiments described above and may have the flanges described above at one or both of its ends.

However, in this embodiment, as shown in FIG. 5, flange 34" is not used, and flange 34''' is secured directly to flange 34' by spot welding or similar fastening method. A neoprene gasket 70 or equivalent element is sized and set in place within tube 30 as shown and thus forms a water tight seal against moisture seepage between flanges 34' and 34'''.

The enablements described in detail above are considered novel over the prior art of record and are considered critical to the operation of at least one aspect of the apparatus and its method of use and to the achievement of the above described objectives. The words used in this specification to describe the instant embodiments are to be understood not only in the sense of their commonly defined meanings, but to include by special definition in this specification: structure, material or acts beyond the scope of the commonly defined meanings. Thus if an element can be understood in the context of this specification as including more than one meaning, then its use must be understood as being generic to all possible meanings supported by the specification and by the word or words describing the element.

The definitions of the words or drawing elements described herein are meant to include not only the combination of elements which are literally set forth, but all equivalent structure, material or acts for performing substantially the same function in substantially the same way to obtain substantially the same result. In this sense it is therefore contemplated that an equivalent substitution of two or more elements may be made for any one of the elements described and its various embodiments or that a single element may be substituted for two or more elements in a claim.

Changes from the claimed subject matter as viewed by a person with ordinary skill in the art, now known or later devised, are expressly contemplated as being equivalents within the scope intended and its various embodiments. Therefore, obvious substitutions now or later known to one with ordinary skill in the art are defined to be within the scope of the defined elements. This disclosure is thus meant to be understood to include what is specifically illustrated and described above, what is conceptually equivalent, what can be obviously substituted, and also what incorporates the essential ideas.

The scope of this description is to be interpreted only in conjunction with the appended claims and it is made clear, here, that each named inventor believes that the claimed subject matter is what is intended to be patented.

What is claimed is:

1. A combination apparatus for passing a utility conduit, while blocking the passage of fire and smoke, between adjacent compartments, the combination comprising:
    a) a pair of wall forms for forming a wall for separating compartments, the wall forms having opposing wall surfaces;
    b) a cylindrical sheet metal tube open at opposing ends thereof, the open ends of the tube each having a transverse first flange integral with the sheet metal tube; and
    c) a second and a third sheet metal flanges sandwiching the first flange and fastened thereto at each of the open ends of the tube, and further, at each of the open ends of the tube, a sheet metal ring positioned between the first and third sheet metal flanges and partially covering the open end of the tube.

2. The combination of claim 1 further comprising a layer of intumescent material positioned within the tube.

3. The combination of claim 1 wherein the flanges and the ring are joined by welding.

4. The combination of claim 1 wherein the tube comprises two collinear sections joined for sliding extension.

* * * * *